(12) United States Patent
Brown

(10) Patent No.: US 6,199,797 B1
(45) Date of Patent: Mar. 13, 2001

(54) AIRCRAFT FLOAT AND SYSTEM UTILIZING THE SAME

(76) Inventor: Michael G. Brown, 215 Conant Rd., Weston, MA (US) 02493

( * ) Notice: Subject to any disclaimer, the term of this patent is extended or adjusted under 35 U.S.C. 154(b) by 0 days.

(21) Appl. No.: 09/247,226

(22) Filed: Feb. 9, 1999

(51) Int. Cl.⁷ .................................................. B64C 25/54
(52) U.S. Cl. .......................................... 244/105; 114/292
(58) Field of Search ................................... 244/101, 105, 244/106, 107; 114/49, 283, 292

(56) References Cited

U.S. PATENT DOCUMENTS

| | | |
|---|---|---|
| D. 390,527 | 2/1998 | Niemier . |
| 3,208,421 * | 9/1965 | Landes et al. ................... 244/105 X |
| 3,467,345 * | 9/1969 | Windecker ............................ 244/105 |
| 4,418,634 | 12/1983 | Gerbus . |
| 4,697,762 | 10/1987 | Arney . |
| 4,915,052 | 4/1990 | Reeser . |
| 5,039,297 | 8/1991 | Masters . |
| 5,367,974 * | 11/1994 | Moraga et al. ................... 244/283 X |
| 5,458,844 | 10/1995 | MacDougall . |
| 5,692,706 | 12/1997 | Arney . |
| 5,718,929 | 2/1998 | Rogerson . |
| 6,016,762 * | 1/2000 | Price ................................. 244/283 X |

* cited by examiner

*Primary Examiner*—Robert P. Swiatek
(74) *Attorney, Agent, or Firm*—William B. Ritchie

(57) ABSTRACT

A lightweight, high strength aircraft float for use by ultralight, experimental, and light general aviation float planes. The float consists of a unitary outer shell that is formed into a desired shape using rotational molding, or blow molding, from a suitable polymer. In the preferred embodiment, the shell is manufactured of a high strength, cross-linked high density polyethylene, which has high strength, high impact resistance and is resistant to degradation by ultraviolet light. It is also preferred that an internal reinforcing structure be utilized to provide additional stiffness and rigidity to the upper and lower surfaces of the float. This structure may consist of the two extruded aluminum box sections, formed to appropriate profiles, which are inserted through small apertures at the front or rear of the roto-molded shell and secured within the shell by mechanical fasteners. One or more mounting devices may be attached to the upper surface of the float to allow the float to be attached to the fuselage of the floatplane. The preferred mounting devices allow for adjustment of the longitudinal placement of the floats, and thus the center of gravity of the floats relative to the center of gravity of the aircraft, by a small amount. Finally, the float may be filled with closed-cell foam of a suitable polymer, such as expanded polyethylene foam, though floats without such a foam are preferred.

8 Claims, 4 Drawing Sheets

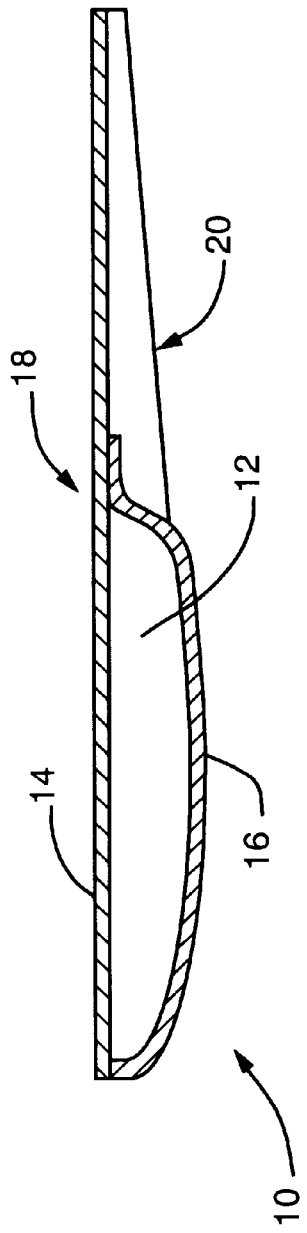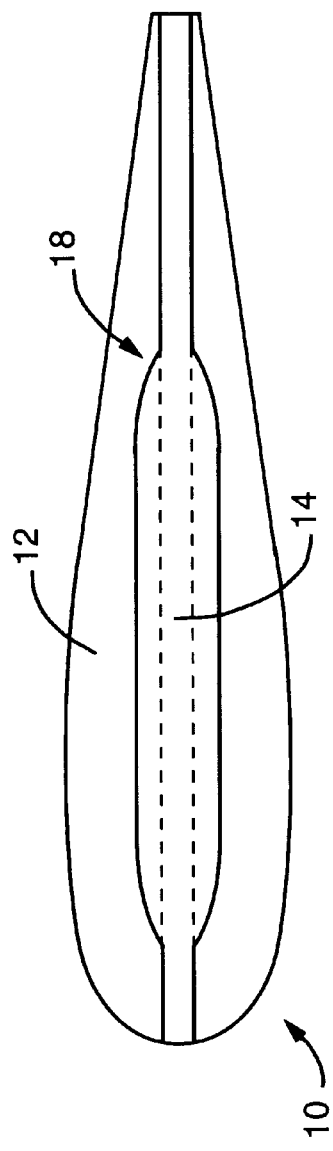

AIRCRAFT FLOAT AND SYSTEM UTILIZING THE SAME

FIELD OF THE INVENTION

The present invention relates to the field of aircraft floats and, in particular, to an aircraft float having a one-piece molded shell for attachment to experimental, ultralight and light general aviation aircraft.

BACKGROUND OF THE INVENTION

Aircraft floats of various types have been attached to the undercarriages of aircraft to allow the aircraft to operate from bodies of water. The three principal types of float that are in common use are aluminum floats, fiberglass floats, and inflatable floats, with the type of float that may be used for a given aircraft depending, in part, upon the aircraft's size and classification. General aviation aircraft, which are all "type certified" by the Federal Aviation Administration (FAA), are commercially assembled aircraft such as corporate executive jets and Cessna light airplanes. Experimental aircraft must be home built and are typically sold as kits. Ultralight aircraft are usually tubing and fabric construction and, again are typically sold in kit form and home built.

Aluminum aircraft floats are typically manufactured from sheets of aircraft grade aluminum riveted and/or bonded onto a series of bulkheads and stringers to form a float having a predetermined shape. Though in widespread use, these floats have a number of drawbacks. First, the aircraft aluminum utilized in the manufacture, and the labor expended in assembling the floats, makes these floats fairly expensive. Second, the use of rivets along the seams on the underside of the float increases the chance that water will seep into the inside of the float. Such seepage can create a dangerous situation due to unpredictable shifts in the center of gravity of the aircraft. In some designs, a water-proof closed-cell foam is utilized to at least partially fill the inside volume of the float to prevent water seepage. However, these foams add weight to the floats and further increase their cost.

Fiberglass floats, such as those described in U.S. Pat. No. 3,208,421, are often utilized on experimental and ultralight aircraft. These floats are typically manufactured either by forming two mating fiberglass shell pieces in two female molds and subsequently bonding the shell pieces together, or by forming a water-proof foam into the desired shape and forming the fiberglass over the foam. Fiberglass floats also have a number of drawbacks. First, the cost of manufacturing fiberglass floats is relatively high as a result of the labor expended in forming the completed float. Second, fiberglass is not very impact resistant and can crack and leak if subjected to impact from rocks, logs, or other underwater obstructions. Third, the seam between the two pieces of the float creates a fault line that is subject to cracking and water leakage. Fourth, the use of foam within many of these floats increases the weight of such floats. Finally, the nature of the fiberglass process creates a hazard to manufacturing workers due to the friability of the fiberglass and the potentially toxic chemicals used to promote bonding.

Inflatable floats, such as those described in U.S. Pat. No. 4,697,762, typically include an outer shell manufactured of a tough fabric and an interior portion that is segregated into a plurality of inflatable interior chambers or bladders. In operation, the chambers are inflated with air until the chambers press against the outer shell to form a relatively hard surface upon which the aircraft may land. Inflatable floats, like the aluminum and fiberglass floats described above, have a number of significant drawbacks. First, water may penetrate the outer shell and occupy the spaces between the inflatable interior chambers causing the same unpredictable changes in weight and shifts in the center of gravity of the aircraft that may occur with aluminum and fiberglass floats. Second, the tough fabric on the outside of the float is prone to absorbing water and carrying water on its upper surface, thus increasing the weight of the aircraft during take-off. Finally, one or more chambers of an inflatable float may deflate unexpectedly, creating a potentially hazardous situation for the pilot.

Therefore, there is a need for an aircraft float that may be utilized with experimental, ultralight, and light general aviation aircraft, is less expensive than existing aluminum and fiberglass floats, is lighter than existing aluminum and fiberglass floats, and is more impact resistant than existing fiberglass floats.

SUMMARY OF THE INVENTION

The invention is a lightweight, high strength aircraft float for use by ultralight, experimental, and light general aviation float planes. The float consists of a unitary outer shell that is formed into a desired shape using rotational molding, or blow molding, from a suitable polymer. In the preferred embodiment, the float includes a shell formed of a thin outer layer of high strength, cross-linked high density polyethylene (HDPE), and a thicker foamed polyethylene inner layer that is created by the use of a foaming agent during the molding process. The preferred shell is manufactured of HDPE due to its high strength and impact resistance across a broad temperature range and its resistance to degradation by ultraviolet light. It is also preferred that an internal reinforcing structure be utilized to provide additional stiffness and rigidity to the upper and lower surfaces of the float. This structure may consist of two extruded aluminum box sections, formed to appropriate profiles, which are inserted through one or more small apertures at the front or rear of the roto-molded shell and secured within the shell by mechanical fasteners. Two or more mounting devices may be attached to the upper surface of the float to allow the float to be attached to the fuselage of the floatplane. The preferred mounting devices allow for adjustment of the longitudinal placement of the floats, and thus the center of gravity of the floats relative to the center of gravity of the aircraft, by a small amount, typically a few inches. Finally, the float may be filled, or partially filled, with a closed-cell foam of a suitable polymer, such as expanded polyethylene foam, though floats without such a foam are preferred.

Therefore, it is an aspect of the invention to provide a floatplane float with a rotationally or blow molded unitary polymer shell.

It is a further aspect of the invention to provide a floatplane float that may include an internal reinforcing structure that is installed by insertion through one or more small openings in a one-piece polymer shell.

It is a further aspect of the invention to provide a floatplane float that has no seams, joints, rivet or penetrations of any kind through the wetted lower surface of the float.

It is a further aspect of the invention to provide a floatplane float that includes a mounting device to allow quick adjustment of the center of gravity of the float relative to the center of gravity of the floatplane.

It is a further aspect of the invention to provide a floatplane float that may be filled with internal foam or may be utilized without internal foam.

It is a further aspect of the invention to provide a floatplane float that performs as well as existing floats but reduces cost, reduces the probability of water leakage in service, and reduces weight relative to existing floats.

It is a still further aspect of the invention to provide a floatplane float that does not need to be inflated with air and that, consequently, cannot deflate during operation.

These aspects of the invention are not meant to be exclusive and other features, aspects, and advantages of the present invention will be readily apparent to those of ordinary skill in the art when read in conjunction with the following description, appended claims and accompanying drawings.

BRIEF DESCRIPTION OF THE DRAWINGS

FIG. 1 is a cut away side view of the preferred embodiment of the aircraft float of the present invention.

FIG. 2 is a top view of the embodiment of FIG. 1.

DETAILED DESCRIPTION OF THE DRAWINGS

Figure 3:
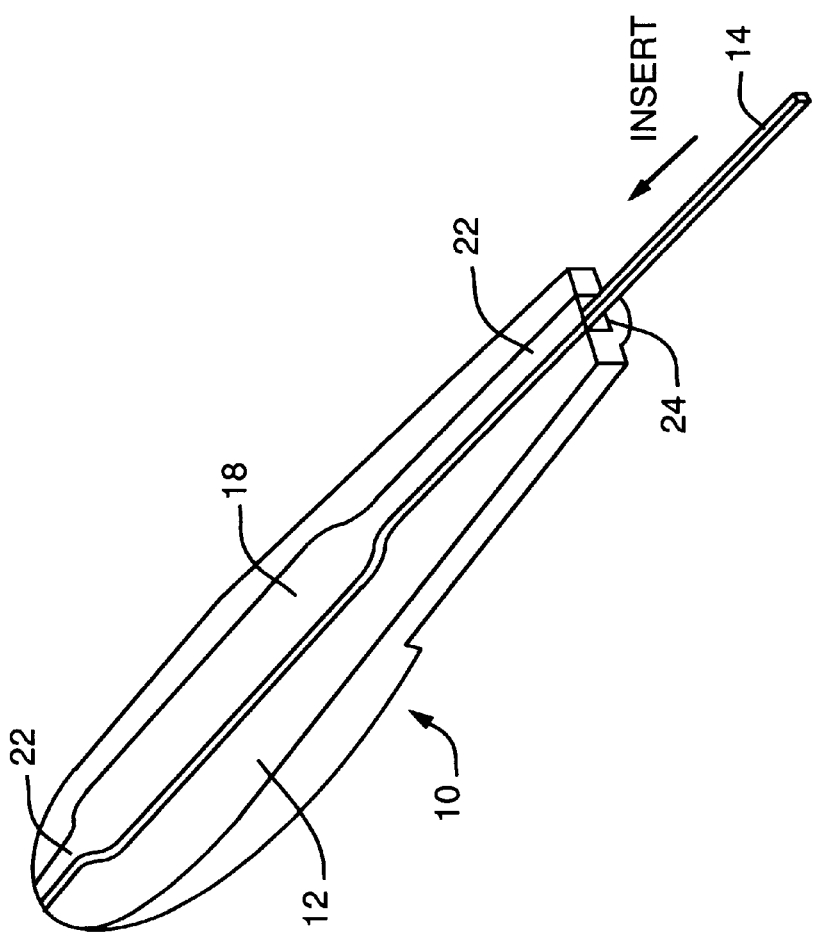
FIG. 3 is an isometric view of an aircraft float showing insertion of a reinforcing structure through a small opening at the rear of the float.

Referring first to FIGS. 1 and 2, one embodiment of the aircraft float 10 is shown. In this embodiment, aircraft float 10 includes a unitary, one-piece, shell 12, a first reinforcing structure 14 disposed along and under the top portion 18 of the shell 12, and a second reinforcing structure 16 disposed along the inside of the bottom portion 20 of the shell 12.

Shell 12 is formed of a suitable polymer into a one-piece structure of predetermined size and shape. Shell 12 is sized to fit a predetermined type or classification of aircraft and is typically shaped as shown in FIGS. 1 and 2. However, shell 12 may be sized and shaped to resemble any number of art recognized floats, including, but not limited to, AIR CREATION trike floats, FULL LOTUS inflatable floats, and PUDDLEJUMPER fiberglass floats.

In the preferred embodiment, the outer layer of unitary shell 12 is rotational molded, or blow molded, from high strength cross-linked high density polyethylene to a thickness of about 0.090 inches and the inner layer will be rotational molded from foamed polyethylene to a thickness of about 0.160 inches. Such a method of construction is preferred as polyethylene provides high strength, high impact resistance across a broad range of temperatures, and resistance to degradation by ultraviolet light. However, it is recognized that other polymers, capable of forming using rotational or blow molding, may be substituted to obtain similar results. In addition, the thickness of the wall of the unitary shell 12 may be varied dependent upon the size and shape of the float, whether a first reinforcing structure 14 is utilized, first and second reinforcing structures 14, 16 are utilized, or whether no reinforcing structures are utilized.

If reinforcing structures are utilized, the first reinforcing structure 14 and second reinforcing structure 16 are preferably extruded aluminum members that are dimensioned to provide enhanced rigidity to the shell. As shown in FIG. 3, it is preferred that the first reinforcing structure 14 be a substantially straight rectangular tube that is dimensioned for insertion through a small aperture 24 into a pocket 22 formed adjacent to the top portion 18 of the shell 12 during molding. The second reinforcing structure 16 is subsequently inserted through the same aperture 24. Once inserted, the first reinforcing structure 14 and second reinforcing structure 16 are preferably secured within the pocket 22 by mechanical fasteners. The first reinforcing structure 14 and second reinforcing structure 16 are typically used to provide a suitably rigid structure for fastening the float 10 to the aircraft. However, in some embodiments, the polymer utilized to manufacture the shell 12 is disposed in a layer of suitable thickness to allow the first reinforcing structure 14 to be eliminated.

In some embodiments, the hollow interior of the shell 12 of the float 10 may be filled, or partially filled, with a closed cell foam of a suitable polymer, such as expanded polyethylene foam, to prevent water from entering the shell. However, the one-piece nature of the shell 12, and the enhanced durability of the materials used in the rotomolding process, militate against the leakage of water within the shell and allow many embodiments of the float 10 to be manufactured without the use of a closed cell foam filler.

The aircraft float 10 of the present invention may also include a mounting device for mounting the float 10 to an aircraft. As discussed with reference to FIGS. 4 and 5, the mounting device is mounted to the top portion 18 of the unitary shell 12 and provides a means of attaching the float 10 to the aircraft. Though it is preferred that such a mounting device be secured to the first reinforcing member 14 to provide sufficient strength and rigidity, it is understood that other methods for attaching the mounting device to the top portion of the unitary shell 12 may be utilized to achieve similar results.

Figure 4:
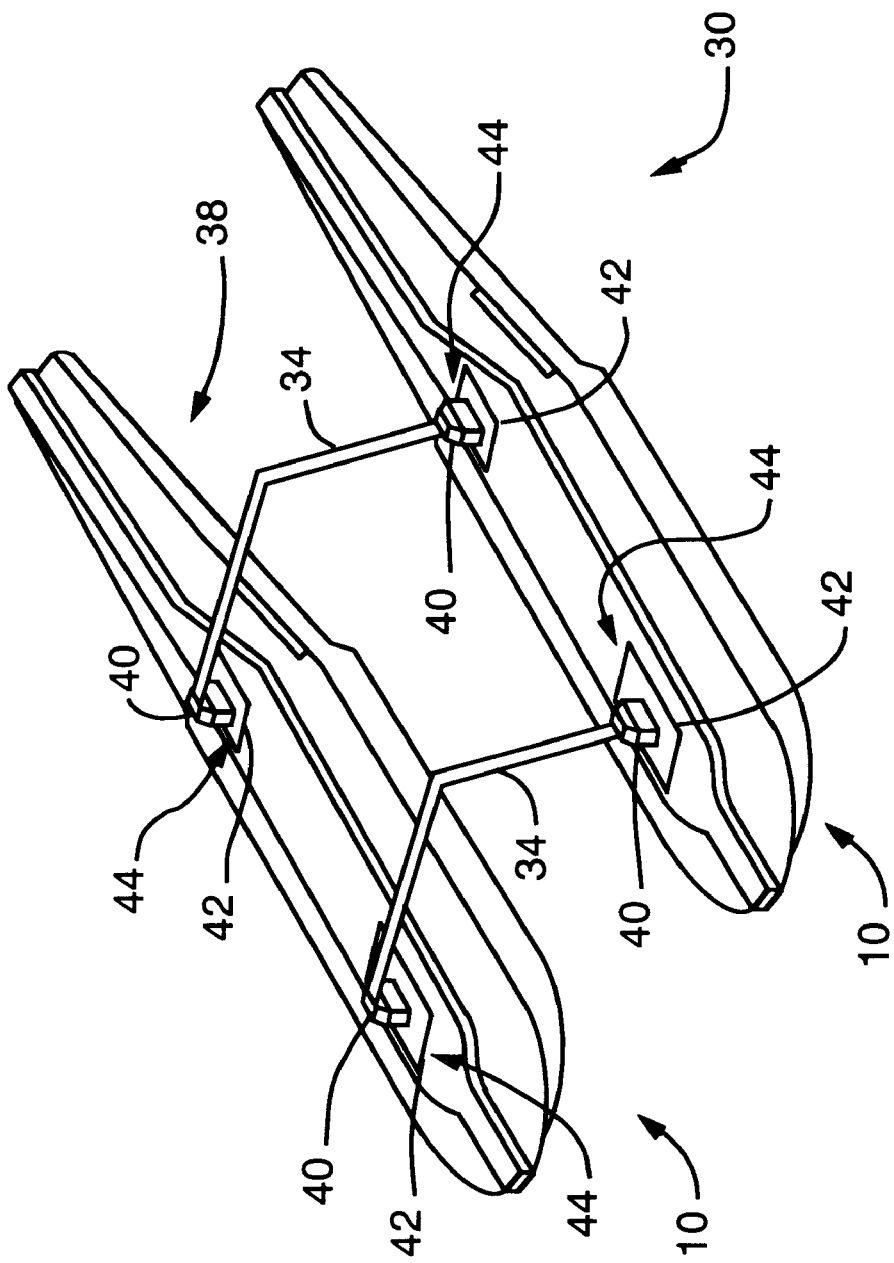
FIG. 4 is an isometric view of an airplane equipped with a float system of the present invention.

Referring now to FIG. 4, an isometric view of the float system 30 of the present invention is shown. The float system 30 includes a pair of floats 10, each having two mounting devices 44 for attaching the float 10 to an aircraft. In the embodiment of FIG. 4, each mounting device 44 is attached to the float 10 and is dimensioned to mate with a gear leg 34 that attaches to the underside of the aircraft 38. Here, each mounting device 44 includes a leg bracket 40 that accepts and secures the gear leg 34, and a mounting plate 42, attached to the leg bracket 40, for attachment to the float 10. In other embodiments, mounting devices 44 are metal plates secured to the floats 10 and having threaded openings for accepting bolts that extend through holes, or flanges, at the ends of the gear legs 34 to secure the gear legs 34 to the floats 10. However, it is intended other art recognized means for attaching a float to an aircraft may be substituted for the mounting devices 44 shown in FIG. 4 to achieve similar results.

Figure 5:
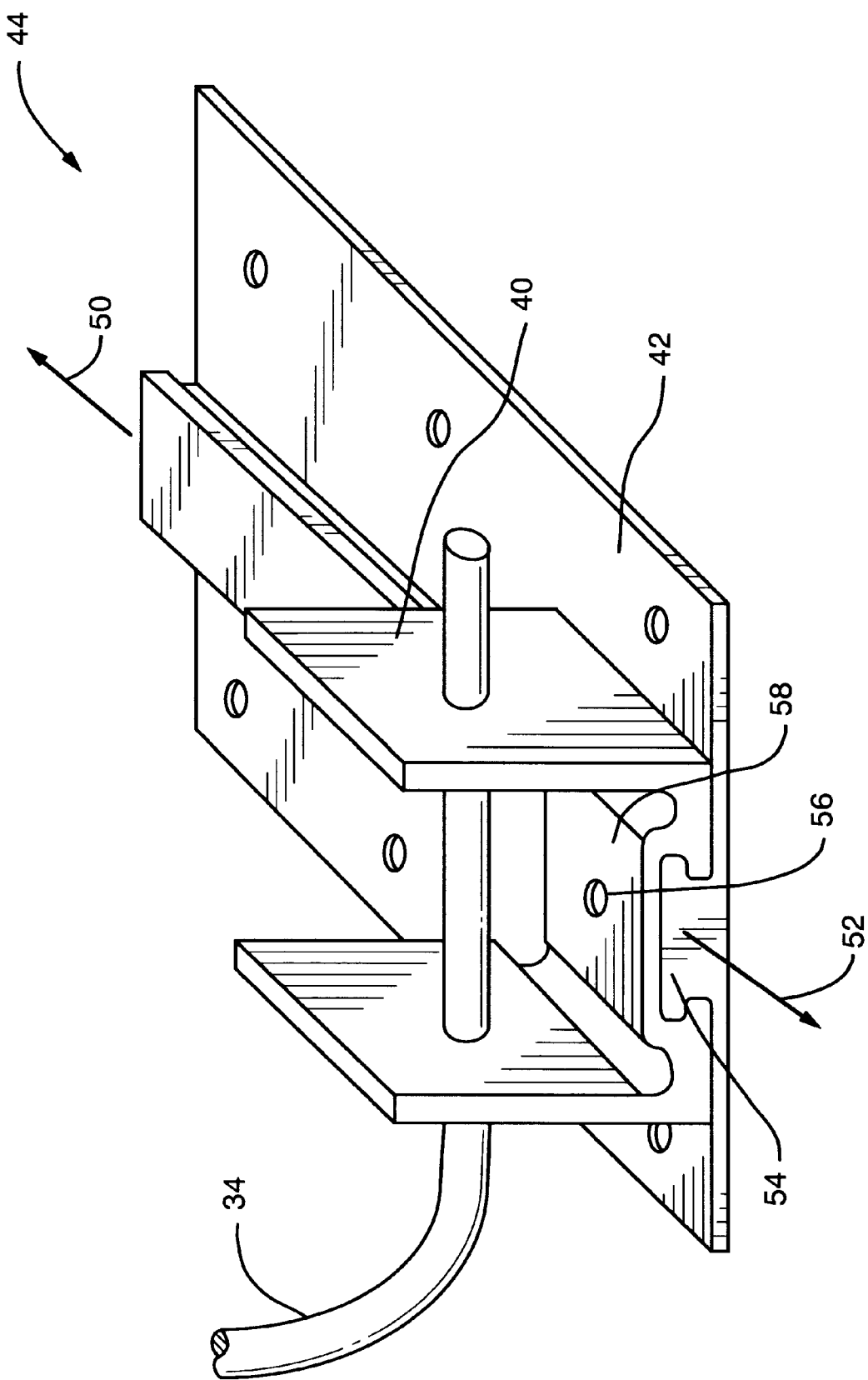
FIG. 5 is an isometric view of the preferred mounting and adjustment mechanism for use with the aircraft float system of the present invention.

As shown in FIG. 5, the preferred mounting devices 44 allow for adjustment of the longitudinal placement of the floats 10, and thus the center of gravity of the floats 10, relative to the center of gravity of the aircraft 38. In this preferred embodiment, mounting device 44 includes a leg bracket 40 that accepts and secures the gear leg 34 to a mounting plate 42. Mounting plate 42 attaches to the float 10 and retains the leg bracket 40 such that it may be adjusted in the direction of arrows 50, 52. The preferred mounting plate 42 includes a "T" shaped keyway 54 to match the shape of leg bracket 40. Leg bracket 40 has one or more openings 56, which are dimensioned to allow at least one fastener to extend through the base 58 and secure the leg bracket 40 to mounting plate 42 once it has been adjusted. In the preferred embodiment, mounting plate 42 contains one or more threaded inserts to accept one or more fasteners (not shown). In other embodiments, leg bracket 40 is secured through other art recognized means.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. An aircraft float comprising:

a unitary shell having an outer surface, an inner surface, a top portion, and a bottom portion; and a first reinforcing structure attached to said inner surface of said top portion of said unitary shell;

wherein said unitary shell is manufactured of a polymer material that is capable of being rotationally molded, and wherein said unitary shell is dimensioned for attachment to a predetermined aircraft.

2. The aircraft float as claimed in claim 1, wherein said shell further comprises a pocket disposed along said inner surface of said top portion, said pocket being dimensioned to accept said first reinforcing structure, and wherein said first reinforcing structure is inserted within said pocket and attached to said inner surface of said top portion of said unitary shell.

3. The aircraft float as claimed in claim 1 further comprising a second reinforcing structure that is positioned adjacent to to said inner surface of said bottom portion of said unitary shell and that is attached to said first reinforcing structure.

4. The aircraft float as claimed in claim 3 wherein said polymer material is polyethylene.

5. An aircraft float system comprising:

a first aircraft float and a second aircraft float, wherein each of said aircraft floats comprises:

a unitary shell having an outer surface, an inner surface, a top portion, and a bottom portion, wherein each of said unitary shells is manufactured of a polymer material that is capable of being rotationally molded, and wherein each of said unitary shells is dimensioned for attachment to a predetermined aircraft;

one or more mounting devices attached to said outer surface of said top portion of said unitary shell for attaching said float to said predetermined aircraft; and a first reinforcing structure attached to said inner surface of said top portion of said unitary shell.

6. The aircraft float system as claimed in claim 5 wherein each of said unitary shells further comprises a pocket disposed along said inner surface of said top portion, said pocket being dimensioned to accept said first reinforcing structure, and wherein said first reinforcing structure is inserted within said pocket and attached to said inner surface of said top portion of each unitary shell.

7. The aircraft float system as claimed in claim 5 wherein each of said aircraft floats further comprises a second reinforcing structure that is positioned adjacent to said inner surface of said bottom portion of said unitary shell and that is attached to said first reinforcing structure.

8. The aircraft float system as claimed in claim 5 wherein each of said aircraft floats further comprises a closed cell foam disposed within said unitary shell.

* * * * *